United States Patent
Li (10) Patent No.: US 9,450,401 B2
(45) Date of Patent: Sep. 20, 2016

(54) CONTROLLING A THERMALLY SENSITIVE OVER-CURRENT PROTECTOR

(71) Applicant: Apple Inc., Cupertino, CA (US)

(72) Inventor: Xingqun Li, San Jose, CA (US)

(73) Assignee: Apple Inc., Cupertino, CA (US)

( * ) Notice: Subject to any disclaimer, the term of this patent is extended or adjusted under 35 U.S.C. 154(b) by 282 days.

(21) Appl. No.: 13/668,964

(22) Filed: Nov. 5, 2012

(65) Prior Publication Data

US 2013/0249868 A1 Sep. 26, 2013

Related U.S. Application Data

(60) Provisional application No. 61/613,361, filed on Mar. 20, 2012.

(51) Int. Cl.
*H02J 7/00* (2006.01)
*H02H 9/02* (2006.01)

(52) U.S. Cl.
CPC ..................... *H02H 9/026* (2013.01)

(58) Field of Classification Search
USPC .................. 320/134–136, 150, 153–154
See application file for complete search history.

(56) References Cited

U.S. PATENT DOCUMENTS

| 4,638,396 A | 1/1987 | Mukli et al. | |
| 5,440,441 A * | 8/1995 | Ahuja | 361/62 |
| 5,689,173 A | 11/1997 | Oosaki et al. | |
| 5,714,866 A * | 2/1998 | S et al. | 320/152 |
| 6,300,859 B1 | 10/2001 | Myong et al. | |
| 6,351,361 B1 | 2/2002 | Kawazu et al. | |
| 6,421,216 B1 | 7/2002 | Myong et al. | |
| 6,608,470 B1 * | 8/2003 | Oglesbee et al. | 320/136 |
| 7,538,519 B2 * | 5/2009 | Daou et al. | 320/134 |
| 7,660,096 B2 | 2/2010 | Golubovic et al. | |
| 7,952,330 B2 | 5/2011 | Mori | |
| 2002/0140401 A1 | 10/2002 | Watanabe et al. | |
| 2004/0170887 A1 | 9/2004 | Masumoto et al. | |
| 2006/0215342 A1 | 9/2006 | Montoya et al. | |
| 2009/0027821 A1 | 1/2009 | Colby et al. | |
| 2011/0175700 A1 | 7/2011 | Bourns | |
| 2012/0181988 A1 * | 7/2012 | Uchibori | 320/134 |

OTHER PUBLICATIONS

Final Office Action (dated Aug. 7, 2014), U.S. Appl. No. 13/669,077, filed—Nov. 5, 2012, First Named Inventor: Xingqun Li, 9 pages.
Non-Final Office Action (dated Jan. 30, 2014), U.S. Appl. No. 13/669,077, filed—Nov. 5, 2012, First Named Inventor: Xingqun Li, (8 pages).

* cited by examiner

*Primary Examiner* — Samuel Berhanu
(74) *Attorney, Agent, or Firm* — Blakely, Sokoloff, Taylor & Zafman LLP (57) ABSTRACT

A method for controlling a thermally sensitive over-current protector is described. A battery current is monitored. It is then determined whether or not the monitored current has exceeded a predetermined threshold during the entirety of a predetermined time interval. If yes, then a current source is signaled to raise its current, so as to increase the heat being generated by a heating element that is being driven by the current source thereby tripping the thermally sensitive over-current protector. Other embodiments are also described and claimed.

23 Claims, 6 Drawing Sheets

CONTROLLING A THERMALLY SENSITIVE OVER-CURRENT PROTECTOR

RELATED MATTERS

This application claims the benefit of the earlier filing date of provisional application No. 61/613,361, filed Mar. 20, 2012, entitled "Controlling a Thermally Sensitive Over-Current Protector".

Some of the subject matter in this application is related to that described in application Ser. No. 13/669,077, "Electrical Over-Current Protection Device" (P12886), filed concurrently herewith.

FIELD

An embodiment of the invention relates to thermally sensitive over-current protection devices such as conductive polymer positive temperature coefficient (PTC) elements. Other embodiments are also described.

BACKGROUND

A resettable, thermally sensitive over-current protector element is an electrical device that conducts current in a low resistance state until the current reaches a sufficiently high level, at which time it will drastically change to a high resistance state. This serves to, in effect, choke off the current, thereby offering over-current protection to the source or destination of the current. The device is said to be thermally sensitive in that the transition between low resistance and high resistance occurs when the device is sufficiently heated (due to the increased current). Resettable means that the protector can automatically return to its low resistance state once current through it has dropped to a sufficiently low level and the device has cooled down. An example of such a device is a conductive polymer positive temperature coefficient (PTC) element that drastically changes from a low resistance state to a high resistance state in response to sufficiently high current passing through it. This change in resistance state may be, for example, at least three orders of magnitude.

PTC elements are often used within rechargeable battery packs in order to restrict the battery current, to thereby help protect the battery from an over-current condition. Once the protection specification for the battery has been determined, e.g. the battery should not be allowed to source more than 5 A continuously for five seconds, a suitable PTC element is selected, so that the transition between the low resistance and high resistance states (the transition temperature) corresponds to the desired battery protection specification. Unfortunately, a PTC element by itself is not accurate enough in many instances, in part due to manufacturing process variations. For instance, consider a desired scheme where the battery current should be cut off when it has reached 5 A for five seconds continuously; in practice, the PTC element may not be able to transition into its high resistance state until a substantially longer time interval has elapsed. In other instances, manufacturing variations may cause the PTC element to trip too early. While efforts have been made to more precisely control when an over-current protector is tripped, those techniques are unable to meet more stringent accuracy requirements.

SUMMARY

In accordance with an embodiment of the invention, a circuit for over-current protection includes a current sense and control circuit that is to be coupled to monitor a current, and provide a control signal that is responsive to the monitored current exceeding a predetermined threshold for a predetermined time interval. A current source circuit has a control input coupled to receive the control signal. The current source circuit is to be coupled to an electrical heating element that is in proximity to a resettable, thermally sensitive, over-current protector. The current source circuit is to raise current through the electrical heating element in accordance with the control signal to a high enough level that causes the over-current protector to trip. This may enable particularly accurate control of the tripping of the over-current protector.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
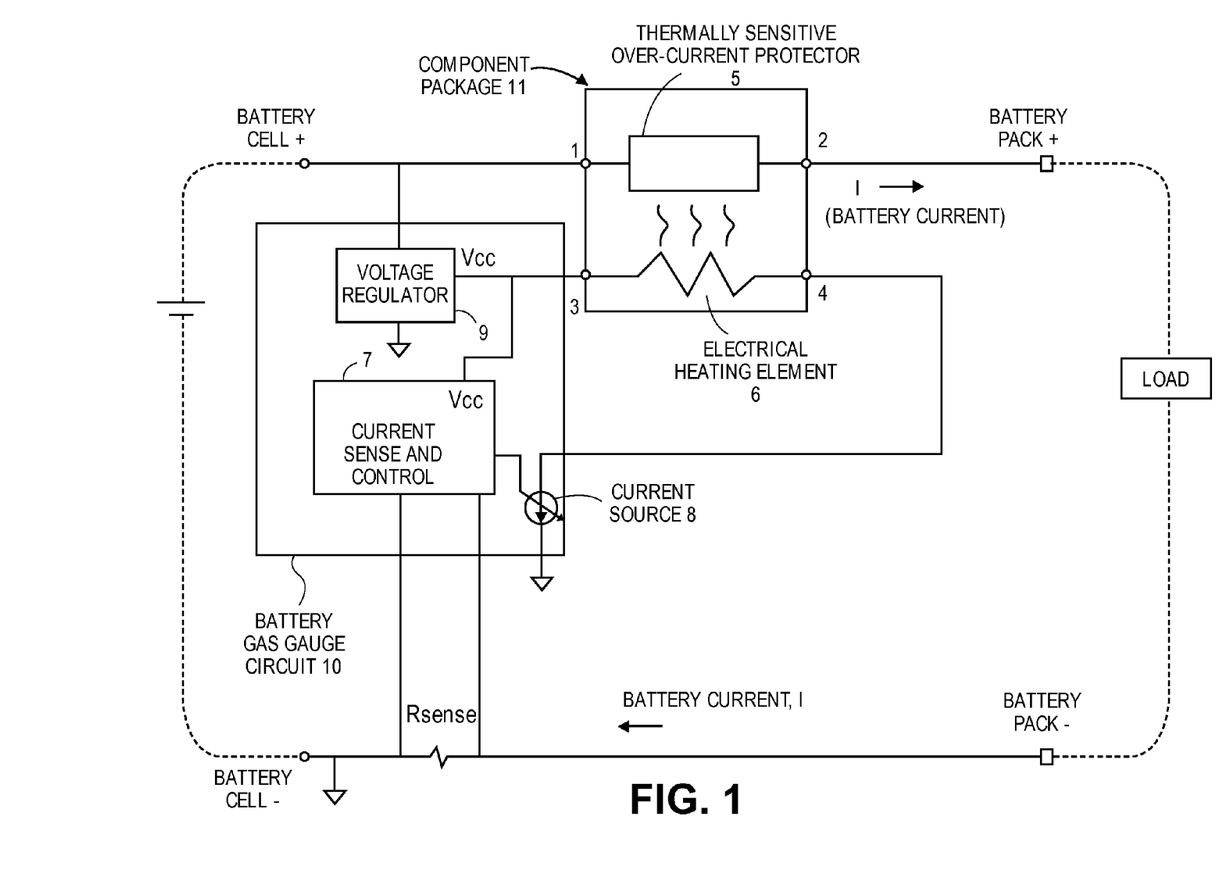
FIG. 1 is a schematic of a circuit for over-current protection.

FIG. 1 is a schematic of a circuit for over-current protection. The over-current protection circuit includes a current sense and control circuit 7 that is coupled to monitor a current, in this example battery current I. The circuit 7 provides a control signal (e.g., a digital signal), which is responsive to the monitored current exceeding a predetermined current threshold, for a predetermined time interval. The circuit 7 may check if a monitored average or dc level of current I exceeds a predetermined threshold, for the entirety of the predetermined time interval; if so, then a control signal is generated that is indicative of whether an over-current condition for the sensed current has occurred.

The control signal is coupled into the control input of a current source circuit 8. The current source circuit 8 may be a controllable (variable) dc current source. The latter is coupled to drive an electrical heating element 6 that is in proximity with a resettable, thermally sensitive, over-current protector 5 (e.g., a PTC element). The current source circuit 8 is designed to raise the current through the electrical heating element 6, in accordance with the control signal received from the current sense and control circuit 7, to a high enough level that causes the over-current protector 5 to trip. The electrical heating element 6 is positioned in close proximity to the over-current protector 5, so as to efficiently transfer heat (due to the current provided by the current source 8) to the over-current protector 5 (and thereby trip the latter). The electrical heating element may be a resistor, e.g. a passive device, such that the entire circuitry can be re-used non-destructively, or is resettable, to protect against multiple over-current conditions without having to be re-wired.

Accuracy in tripping the over-current protector 5 may be improved by, for example, enabling the circuit 7 to calculate the total charge that has been delivered by the battery (not shown) in a predetermined time interval. An increased heating element drive current (to be provided by the current source 8) is selected that suddenly causes the heating element 6 to generate enough heat so that the over-current protector 5 is tripped immediately (upon the indication being given by the current sense and control circuit 7 that the maximum amount of charge has been exceeded in the given time interval). Further precision in this process may be achieved by making the current source 8 adjustable or variable, e.g. capable of providing any one of three or more discrete levels of dc current, so that the current sense and control circuit 7 can, if needed, vary the level of the heating element drive current in order to more efficiently control the tripping of the over-current protector 5.

Figure 7:
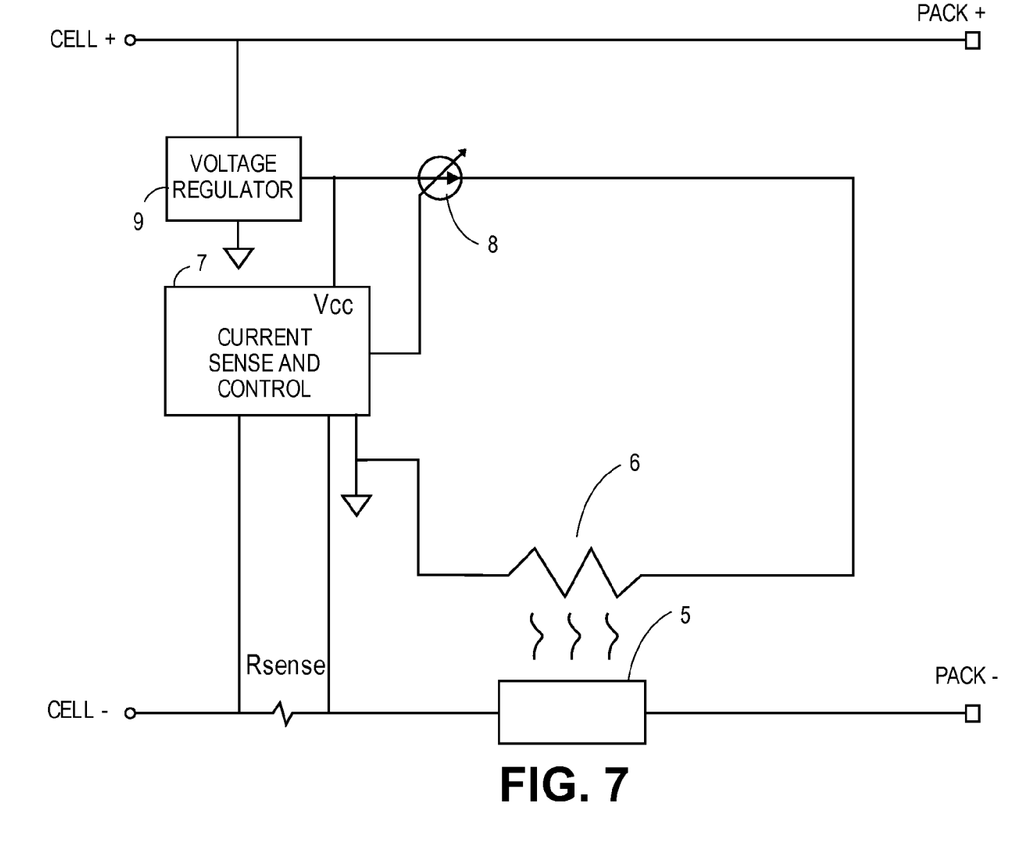
FIG. 7 is a schematic of an over-current protection circuit in which the thermally sensitive over-current protector is in the negative battery rail.

In one embodiment, the current sense and control circuit 7 is able to monitor the current (dc battery current I, in this case) by detecting the voltage across a current sense resistor Rsense that may be in series with the over-current protector 5 as shown. Note that in FIG. 1, while Rsense is located in the negative battery rail, and the over-current protector 5 is located in the positive battery rail, Rsense is nevertheless said to be in series with the over-current protector 5 and the load, because battery current is equal in both the positive and negative battery rails. In contrast, in the embodiment of FIG. 7, both the over-current protector 5 and the Rsense are located (in series) in the negative battery rail. In many instances, the current sense resistor Rsense is coupled between a battery cell terminal and its associated (same polarity) battery pack terminal. It should be understood that there may be multiple cells in a given battery pack. For instance, there may be two or more cells in series, while in other cases there may be two or more cells in parallel. In general, the sense resistor Rsense should be appropriately located so as to conduct the current to be monitored. For reasons given below, locating Rsense in the negative battery rail, as opposed to the positive battery rail, provides particular advantages.

The over-current protection circuit depicted in FIG. 1 may be part of a battery gas gauge circuit 10 that may be embedded within the battery pack, and has a digital communications bus (not shown) through which the gas gauge circuit 10 reports on the health of the battery pack. A voltage regulator 9 (such as a dc-dc regulator) may be provided to step down the battery cell voltage and provide a regulated dc power supply voltage Vcc to the current sense and control block 7 (as well as to other circuit elements of the battery gas gauge 10 that are not shown), relative to a power supply return or ground node that may be directly connected to the negative battery cell terminal. The voltage regulator 9 may be coupled at one end to a positive battery terminal (e.g., a positive cell terminal) and at another end to a negative battery terminal (e.g., a negative cell terminal).

Figure 5:
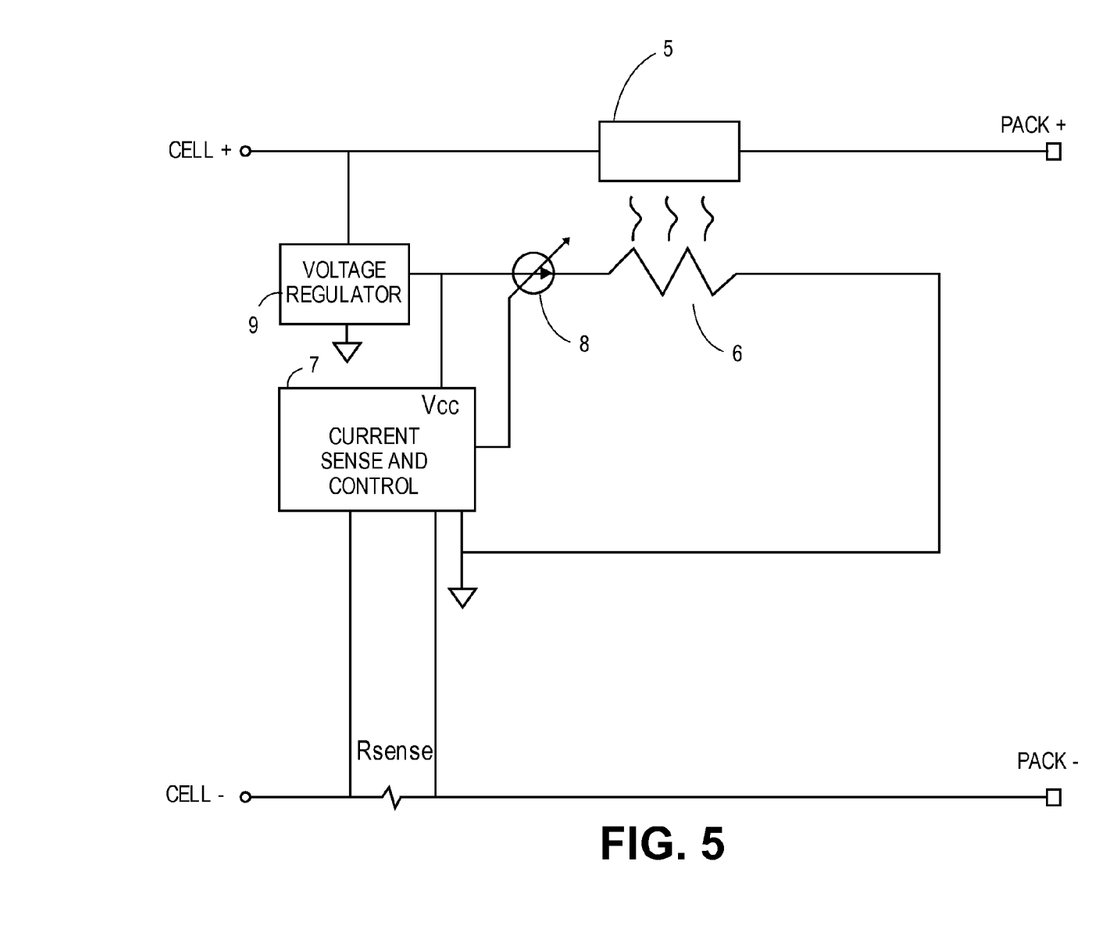
FIG. 5 is a schematic of another circuit for over-current protection, in this case using a high side current source for driving the heating element.

In the embodiment of FIG. 1, the current source 8 is actually a current sink that is coupled on the "low side", at its one end to a power supply return or ground terminal of the gas gauge circuit 10. In this configuration, the current source 8 actually sinks current from the Vcc output terminal of the voltage regulator 9. Thus, the term "current source" is used here interchangeably to refer to both a current sink and a current source. The former is actually shown in the schematics of FIG. 5 and FIG. 7, which are alternatives to the circuit of FIG. 1, where the current source 8 is on the "high side", being coupled at its one end to the Vcc terminal of the voltage regulator 9.

The battery gas gauge circuit 10 may include a programmable micro controller that implements the functions of the current sense and control block 7, using a combination of analog voltage sensing circuitry (e.g., current sense amplifier), analog-to-digital conversion, and digital signal processing. The latter may serve to analyze the detected (digitized) current sense resistor voltage, in order to make the determination that the monitored current has exceeded the predetermined threshold over the predetermined time interval. The current threshold and the time interval may be set by storing corresponding digital numbers for them in non-volatile memory of the micro controller (not shown).

While FIG. 1 shows several components, in addition to the current sense and control block 7 and the current source 8, this does not mean that all components shown are required in a given embodiment of the invention. For instance, a circuit for over-current protection may only include the current sense and control circuit 7 together with the current source 8, e.g. as part of a battery gas gauge circuit 10; the over-current protector 5 and its associated electrical heating element 6 may be provided by a different entity and need not be part of the gas gauge circuit 10. The current sense and control circuit 7 has the capability to control the current source 8 which is to be coupled to drive the electrical heating element 6 (which is in proximity with the protector 5), and the battery current I being monitored may be the same as the current passing through the over-current protector 5. A given figure may thus depict several embodiments, where each embodiment may be covered by at least a subset of the components shown in the figure.

In a further embodiment, what is shown in FIG. 1 may be part of a battery pack circuit that may be embedded within a battery pack having one or more battery cells. The arrangement shown in FIG. 1 would thus be coupled between a positive battery cell terminal and its adjacent positive pack terminal, and between a negative battery cell and its adjacent negative pack terminal (also referred to here as the battery rails). The battery cell (not shown) may be a typical rechargeable battery cell such as a lithium polymer or lithium ion chemistry cell. Note however that the term "battery" is used here in a generic sense as referring to a supply of electrical energy or power that may or may not be "rechargeable"; the term is thus not limited to electrochemical conversion devices and instead may refer to, for example, an ultra-capacitor.

Figure 2:
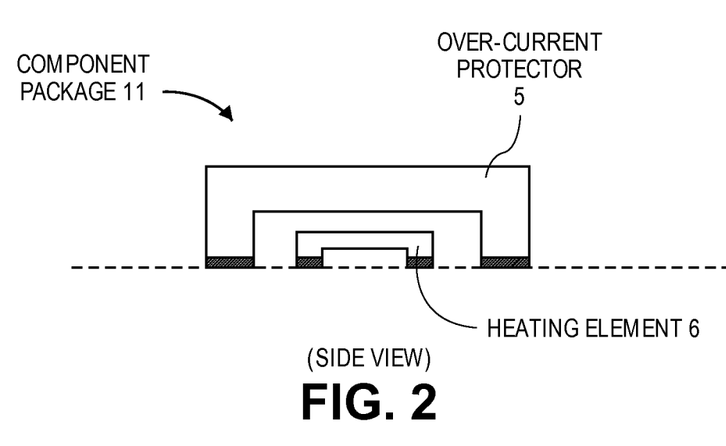
FIG. 2 is a conceptual side view of a component package having an over-current protector and an integrated heating element.
Figure 3:
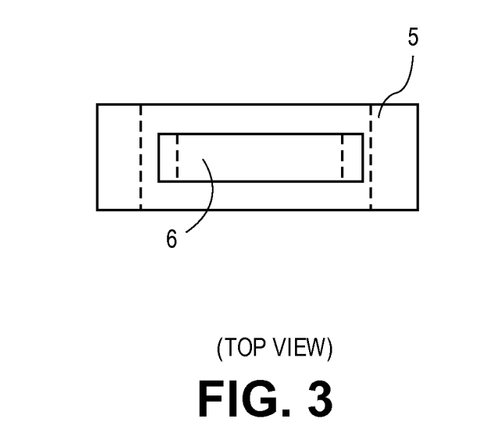
FIG. 3 is a top view of the component package.
Figure 4:
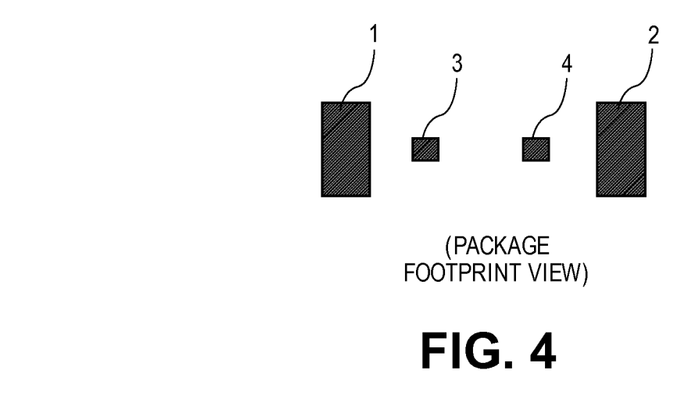
FIG. 4 is a package footprint of the component package.

Turning now to FIGS. 2-4, an embodiment of the invention as an electrical over-current protection device is shown. The figures depict an electronic component package 11 having integrated therein first and second pairs of package terminals. Referring back to FIG. 1, the first pair of terminals 1, 2 are coupled to the over-current protector 5, while the second pair of terminals 3, 4 are coupled to the electrical heating element 6. The drive current for the heating element 6 comes in through one of the terminals 3, 4 and out the other; similarly, the current of concern (to be choked off in the event of an over-current condition) enters the over-current protector through one of the terminals 1, 2 and exits out the other. In addition, the first pair is electrically isolated from the second pair in the sense that there is essentially an open circuit (very high resistance) across any one of the first pair and any one of the second pair of terminals. The terminals 1-4 may be edge-formed surface mount terminal electrodes, for being soldered to a printed circuit/wiring board (not shown). Their footprint may be as shown in FIG. 4 where it is clear that the first pair of terminals 1, 2 are larger and spaced outward of the smaller, second pair of terminals 3, 4. The surface mount package may be a modification to a conventional surface mount packaged PTC over-current protection element, where the heating element 6 has been added to the bottom of the over-current protector 5, prior to being covered with a protective layer (not shown). The protective layer that covers the PTC layer and the resistive material layer may be a plastic film that exposes only the first and second pairs of terminals or electrodes. This is depicted in the side view of FIG. 2 where the four exposed electrodes are shown as darker or shaded regions. FIG. 2 is a side view of the component package 11, showing in conceptual form the heating element 6 lying entirely below the over-current protector 5. In this case, the over-current protector 5 is larger than and entirely overlays the heating element 6 (see the top view in FIG. 3 which also shows this feature).

As suggested above, the over-current protector 5 may be a layer of conductive polymer PTC material or polymeric PTC material that abuts the first pair of terminals 1, 2 (and not the second pair 3, 4), while the heating element 6 may be a passive resistor, e.g. carbon composition, carbon film, metal film, metal oxide film, thick film, thin film and wirewound. In one embodiment, the component package 11 is formed as a layer of resistive material that abuts the second pair of electrodes 3, 4 (and not the first pair 1, 2) and has been created on an electrically insulating substrate that is also thermally conductive and is sandwiched between a PTC layer on top and the layer of resistive material below. Thus, referring to FIG. 2 and the side view, the electrically insulating substrate that is also thermally conductive would be positioned in the area between the top surface of the heating element 6 and the bottom surface of the over-current protector 5. Example materials for such a substrate include ceramic. Note that the thermal conductivity of the substrate should be maximized, e.g. using a thermally conductive epoxy layer to join the PTC layer with the resistive layer, so as to render the process of tripping the over-current protector 5 more accurate and also more efficient from a power consumption standpoint (due to the need for the heating element driving current).

Figure 6:
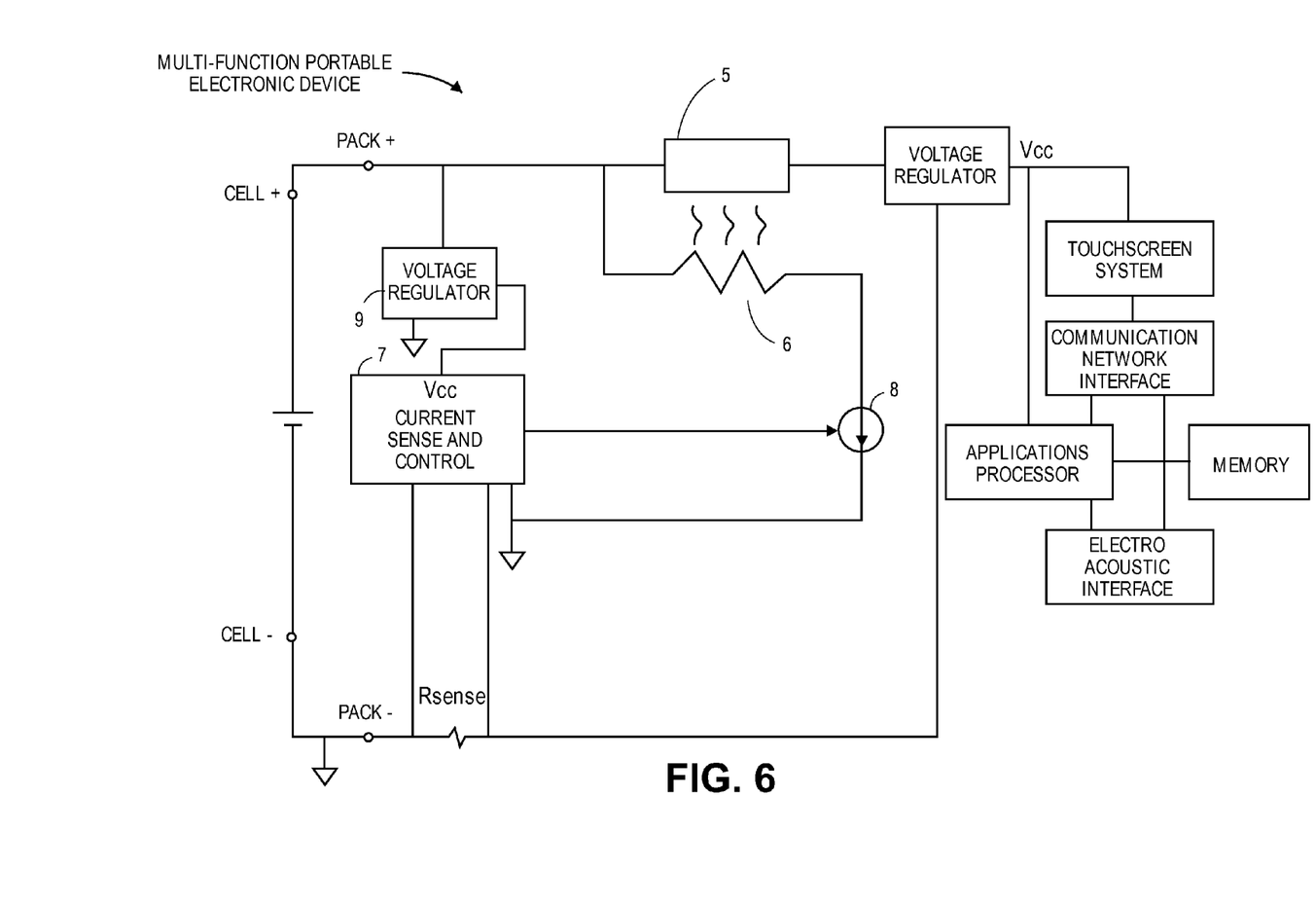
FIG. 6 is a combined block diagram and circuit schematic of a multifunction portable electronic device and another embodiment of a technique for controlling a thermally sensitive over-current protector.

It should also be noted that in the component package 11, as it is depicted in the over-current protection circuit of FIG. 1, there are two pairs of terminals, where the first pair of terminals 1, 2 is electrically isolated from the second pair of terminals 3, 4. As explained above, this arrangement allows for accurate control of the over-current protector 5, by accurately controlling the driving of the electrical heating element 6 using the current source 8 and a separate voltage regulator 9. As an alternative to such a scheme, FIG. 6 shows an embodiment of the over-current protection device that does not need four separate terminals, within the component package 11 (see for example FIG. 1). In this case, the over-current protector 5 and the heating element 6 may share a single electrode or package terminal, which is coupled in this case to a positive battery terminal (either a cell terminal or a pack terminal). The heating element current is thus sourced directly from the battery cell terminal or battery pack terminal, rather than through the voltage regulator 9.

Another embodiment of the invention, which is depicted in FIG. 6, is a multi-function portable electronic device that is being powered by a battery (a single cell battery in this case), through the over-current protection circuit. The portable device may for example be a smart phone, a laptop computer, or a tablet computer. It has a touch screen system, a communications network interface (e.g., to a cellular terrestrial communications network), electro-acoustic transducer interface circuitry (including amplifiers for sensing and driving microphones and speakers), and an applications processor (generically referring to a central processing unit, a system on a chip or other primary computing component) that is coupled to the touch screen, communications network interface and the electro-acoustic transducer circuitry; the processor is programmed to run a touchscreen graphical user interface, a telephony application, and a digital audio player application that may be stored in the non-volatile memory. The battery supplies its battery current, which may power all of these elements.

Figure 8:
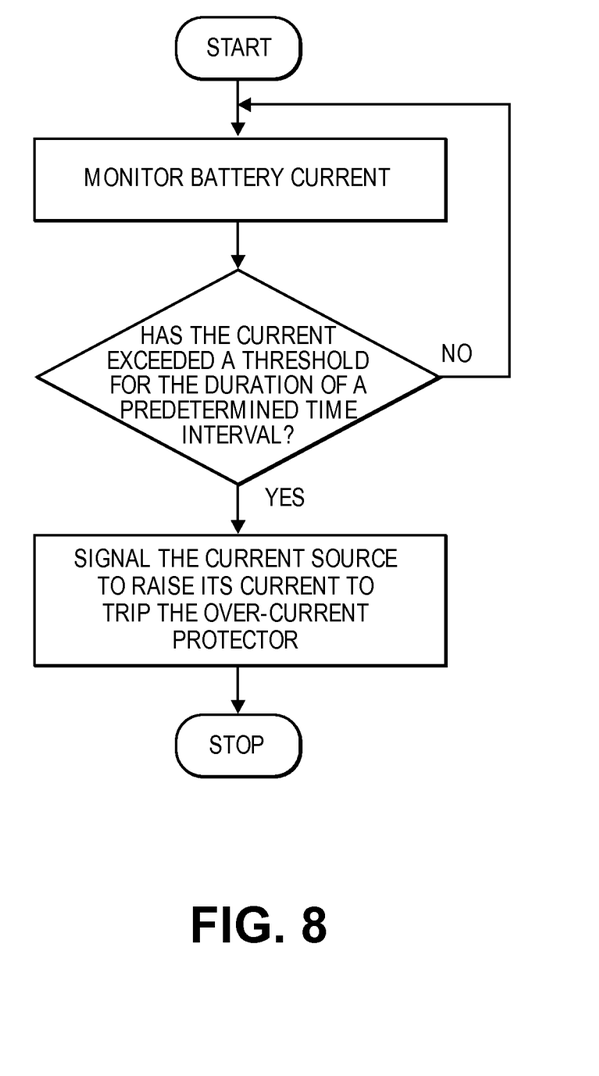
FIG. 8 is a flow diagram of a method for controlling a thermally sensitive over-current protector.

FIG. 8 is a flow diagram of a method for controlling a thermally sensitive over-current protector. The operations of this method may be performed by the current sense and control block 7 described above, for example in the form of operations by a programmed processor (e.g., a microcontroller as part of the gas gauge circuit 10). A battery current is monitored; while monitoring the battery current, determinations are made as to whether or not the monitored current has exceeded a predetermined threshold, e.g. 5 Amperes, during the entirety of a predetermined time interval, e.g. at least one second. When the threshold has been determined to have been exceeded for the duration of the predetermined time interval, then a current source is signaled to raise its current, so as to increase the heat being generated by an electrical heating element that is being driven by the current source thereby tripping the thermally sensitive over-current protector. As described above in connection with the figures, the monitored battery current may be the same as the current through the over-current protector. This process allows more accurate control of how the over-current protector chokes off the battery current, thereby protecting the battery during over-current conditions more consistently across a large number of manufactured specimens of the over-current protector without having to specify, for example, a more accurate PTC element.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while the figures show the schematic symbol of a resistor when depicting the electrical heating element 6, this does not mean that the means for conducting current through the second pair of terminals 3, 4 and for generating heat that is transferred to the PTC element must, in all instances, be a two terminal passive resistor device. As an alternative, another passive device may be used that can generate sufficient heat in response to electrical current being passed through it and that is re-usable (for multiple over-current conditions). As yet another alternative, an active device may be used, such as a diode or a transistor, which may also be capable of generating the desired heat at a suitable level of drive current. Also, while the figures refer to a battery current being monitored, that is within a battery rail, the over-current protection device and the methodology for controlling an over-current protector may also be used to limit other types of current, such as a current in a signal line or power line of a communications bus. Lastly, while the figures show the use of a sense resistor for monitoring the current, other techniques for obtaining a sufficiently accurate measure of the current are possible, e.g. a Hall effect sensor. The description is thus to be regarded as illustrative instead of limiting.

What is claimed is:

1. A circuit for over-current protection, comprising:
   a current sense and control circuit to be coupled to monitor a load current, and provide a control signal that is responsive to the monitored load current exceeding a predetermined threshold for a predetermined time interval;
   an automatically resettable, thermally sensitive over-current protector that conducts the load current;
   an electrical heating element that is in proximity to the resettable, thermally sensitive over-current protector and is to conduct a heating current, being separate from the load current; and
   a current source circuit having a control input coupled to receive the control signal, wherein the current source circuit is coupled to the electrical heating element that is in proximity to the resettable, thermally sensitive, over-current protector, wherein the current source circuit is to raise the heating current through the electrical heating element in accordance with the control signal to a high enough level that causes the over-current protector to trip.

2. The circuit of claim 1 further comprising a current sense resistor in series with the over-current protector, wherein the current sense and control circuit is coupled to detect voltage across the current sense resistor.

3. The circuit of claim 2 wherein the current sense resistor is to be coupled between a battery cell terminal and a battery pack terminal.

4. The circuit of claim 1 wherein the current sense and control circuit is part of a battery gas gauge integrated circuit that is to be coupled to a battery, and wherein the monitored current is the current that is output by the battery.

5. The circuit of claim 1, wherein the over-current protector is a conductive polymer positive temperature coefficient (PTC) element that drastically changes from a low resistance state to a high resistance state in response to sufficiently high current passing through it.

6. The circuit of claim 1, wherein the electrical heating element is a resistor.

7. The circuit of claim 6, wherein one end of the resistor is to be coupled to a positive battery terminal, and another end is coupled to the current source circuit such that the current source circuit is coupled between said another end of the resistor and a power supply return terminal of the current sense and control circuit.

8. The circuit of claim 6, further comprising a voltage regulator having an input coupled to a positive battery terminal and an output coupled to a) one end of the resistor and b) a power supply input of the current sense and control circuit.

9. The circuit of claim 8, wherein the current source circuit is coupled between the output of the voltage regulator and said one end of the resistor, and another end of the resistor is coupled to a power supply return terminal of the current sense and control circuit.

10. The circuit of claim 1, wherein the current source is variable, having a plurality of discrete current levels, and is to raise the heating current through the electrical heating element to any one of a plurality of discrete heating current levels in accordance with the control signal.

11. A battery pack circuit comprising:
    a positive battery pack terminal and a negative battery pack terminal;
    an automatically resettable thermally sensitive over-current protector coupled in series with one of the positive or negative battery pack terminals to conduct battery charging current and battery discharging current;
    an electrical heating element in proximity with the over-current protector that is to conduct a heating current separate from the battery charging current and the battery discharging current being conducted by the over-current protector;
    a current sense and control circuit coupled to monitor battery pack current through the positive pack terminal or the negative pack terminal and provide a control signal that is responsive to the monitored current exceeding a predetermined threshold for a predetermined time interval; and
    a current source circuit having a control input coupled to receive the control signal, wherein the current source circuit is coupled to the electrical heating element and is to raise the heating current through the electrical heating element in accordance with the control signal to a high enough level that trips the over-current protector.

12. The battery pack circuit of claim 11 further comprising a current sense resistor in series with the over-current protector, wherein the current sense and control circuit is coupled to detect voltage across the current sense resistor, wherein the current sense resistor is coupled between a battery cell terminal and a battery pack terminal.

13. The battery pack circuit of claim 11 wherein the current source is variable having a plurality of discrete current levels and is to raise the heating current through the electrical heating element to any one of the plurality of discrete current levels in accordance with the control signal.

14. The battery pack circuit of claim 13 wherein the over-current protector is a conductive polymer positive temperature coefficient (PTC) element that drastically changes from a low resistance state to a high resistance state in response to sufficiently high current passing through it.

15. The battery pack circuit of claim 11 further comprising a voltage regulator having an input coupled to a positive battery cell terminal, and an output coupled to a) one end of the heating element and b) a power supply input of the current sense and control circuit.

16. A portable electronic system comprising:
a) a touch screen system;
b) a communications network interface;
c) electro-acoustic transducer interface circuitry;
d) a programmable processor coupled to the touch screen, communications network interface and electro-acoustic transducer circuitry and programmed to run a touchscreen graphical user interface, a telephony application, and a digital audio player application;
e) a battery to supply battery current for powering the elements a)-d);
f) an automatically resettable, thermally sensitive, over-current protector in series with the battery and the elements a)-d) so as to conduct battery current;
g) an electrical heating element in proximity with the over-current protector that is to conduct a heating current separate from the battery current;
h) a current sense and control circuit coupled to monitor the battery current, and provide a control signal that is responsive to the monitored current exceeding a predetermined threshold for a predetermined time interval; and
i) a variable current source circuit having a control input coupled to receive the control signal, wherein the current source circuit is coupled in series with the electrical heating element and is to raise the heating current through the electrical heating element in accordance with the control signal,
wherein the current sense and control circuit is to select the heating current as any one of a plurality of discrete current levels and signal the variable current source circuit to raise the heating current to the selected level, which is a high enough level that causes the over-current protector to trip.

17. The system of claim 16, wherein the current sense and control circuit is part of a battery gas gauge integrated circuit that is coupled to the battery, and wherein the monitored battery current is the current that is output by the battery.

18. The system of claim 16 wherein the over-current protector is a conductive polymer positive temperature coefficient (PTC) element that drastically changes from a low resistance state to a high resistance state in response to sufficiently high current passing through it.

19. The system of claim 16 further comprising a voltage regulator coupled to be powered by the battery and to power the current source circuit.

20. A method for controlling an automatically resettable, thermally sensitive over-current protector, comprising:
monitoring battery current through the automatically resettable, thermally sensitive over-current protector; and
determining whether or not the monitored current has exceeded a predetermined threshold during the entirety of a predetermined time interval,
wherein if the threshold has been determined to be exceeded, then a current source is signaled to raise a heating current through a heating element, which is separate from the monitored battery current, to a high enough level thereby tripping the automatically resettable, thermally sensitive over-current protector.

21. The method of claim 20 wherein the predetermined time interval is at least one second.

22. The method of claim 20 wherein the current source can produce any one of a plurality of discrete heating current levels.

23. The method of claim 20 further comprising:
supplying the heating current from a voltage regulator that is being powered by a battery whose battery current is being monitored, and wherein monitoring the battery current and determining whether or not the battery current has exceeded the threshold are performed by circuitry that is being powered by the voltage regulator.

* * * * *